(12) United States Patent
Buswell

(10) Patent No.: US 9,152,552 B2
(45) Date of Patent: Oct. 6, 2015

(54) SECURING SENSITIVE INFORMATION IN A NETWORK CLOUD

(75) Inventor: John I. Buswell, Athens, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 372 days.

(21) Appl. No.: 13/610,592

(22) Filed: Sep. 11, 2012

(65) Prior Publication Data

US 2014/0074450 A1    Mar. 13, 2014

(51) Int. Cl.
*G06F 12/02* (2006.01)
*H04L 12/861* (2013.01)

(52) U.S. Cl.
CPC ............ *G06F 12/0246* (2013.01); *H04L 49/90* (2013.01)

(58) Field of Classification Search
None
See application file for complete search history.

(56) References Cited

U.S. PATENT DOCUMENTS

| | | |
|---|---|---|
| 6,075,938 A | 6/2000 | Bugnion et al. |
| 7,174,390 B2 | 2/2007 | Schulter et al. |
| 7,539,824 B2 | 5/2009 | Lolayekar et al. |
| 7,620,794 B2 | 11/2009 | Sakaki et al. |
| 8,004,998 B2 | 8/2011 | Levy et al. |
| 8,060,875 B1 | 11/2011 | Lambeth |
| 8,095,525 B2 | 1/2012 | Le et al. |
| 2003/0236945 A1* | 12/2003 | Nahum ......................... 711/114 |
| 2006/0075191 A1* | 4/2006 | Lolayekar et al. ............ 711/114 |
| 2007/0266433 A1 | 11/2007 | Moore |
| 2008/0104346 A1* | 5/2008 | Watanabe et al. ............. 711/162 |
| 2008/0104347 A1* | 5/2008 | Iwamura et al. .............. 711/162 |
| 2008/0104443 A1* | 5/2008 | Akutsu et al. ..................... 714/6 |
| 2009/0172248 A1 | 7/2009 | You |
| 2010/0058014 A1* | 3/2010 | Satou et al. ................... 711/162 |
| 2011/0035494 A1* | 2/2011 | Pandey et al. ................. 709/224 |
| 2011/0173604 A1* | 7/2011 | Nakamura et al. ............ 717/173 |
| 2012/0131286 A1 | 5/2012 | Faith et al. |

OTHER PUBLICATIONS

Intel® Flash Sector Manager User's Guide, Nov. 2006, 42 pages.

\* cited by examiner

*Primary Examiner* — Omar Fernandez Rivas
*Assistant Examiner* — Joseph J Rokita
(74) *Attorney, Agent, or Firm* — Shimokaji IP

(57) ABSTRACT

A virtual non-volatile memory is simulated for a virtual switch. Operating instructions from the non-volatile memory of a physical switch may be translated into a flash type file. The flash type file may be stored on a virtual storage area in the virtual switch. Operating instructions in the virtual switch may access the flash type file in the virtual storage area without the need to access the non-volatile memory in the physical switch.

8 Claims, 2 Drawing Sheets

SECURING SENSITIVE INFORMATION IN A NETWORK CLOUD

BACKGROUND

The present invention relates to network virtualization, and more specifically, to simulating a non-volatile memory in virtual distributed switches.

In a physical switch, accessing memory for running software operations typically involves access to a physical memory module such as random access memory (RAM) or a flash memory. Physical switch software may interact with physical flash memory on the switch hardware. This device maybe used to store a compressed file system such as JFFS2 or it may write directly to an offset value on the device.

When porting network operating systems from physical switches to virtualization environments, it may be difficult to access memory for running software since when in a virtual distributed switching platform, the virtual distributed switch does not have physical flash memory hardware or physical NVRAM available. The flash memory, particularly when referenced by offset and structured, is typically hardware specific and software may be written for a particular family of physical switches. A considerable amount of software modification is traditionally required to change the existing network operating system in order to accommodate the non-standard platform. Since network operating systems are typically designed to write data directly to flash via a memory technology device interface, it may be a major drawback to have to modify each element of the code that normally reads/writes to flash to read/write to configuration files instead. This can make utilizing the switch software very difficult in a virtualized solution such as a virtual distributed switch. The virtual distributed switching platform cannot readily share code with physical switches, which can lead to a fragmented code base supporting multiple platforms and increased cost.

SUMMARY

According to one embodiment of the present invention, a network switch comprises a non-volatile memory module; a virtual memory storage architecture; a data storage module including a translation driver; and a processor configured to: operate the translation driver to duplicate a flash type file stored in the non-volatile memory, and store the duplicated flash type file in the virtual memory storage architecture.

According to still yet another embodiment of the present invention, a computer program product for simulating a non-volatile memory in a virtual switch, the computer program product comprising a computer readable storage medium having computer readable program code embodied therewith, the computer readable program code being configured to: access a physical non-volatile memory module on a physical switch for operating instructions; operate a Linux translation driver to interface with the physical non-volatile memory module; translate, using the Linux translation driver, a set of operating instructions from the physical non-volatile memory module into a flash type file of the operating instructions; store the translated flash type file to a virtual memory area; and access, with the virtual switch, the translated flash type file in the virtual memory area for use as operating instructions in the virtual switch.

DETAILED DESCRIPTION

Figure 1:
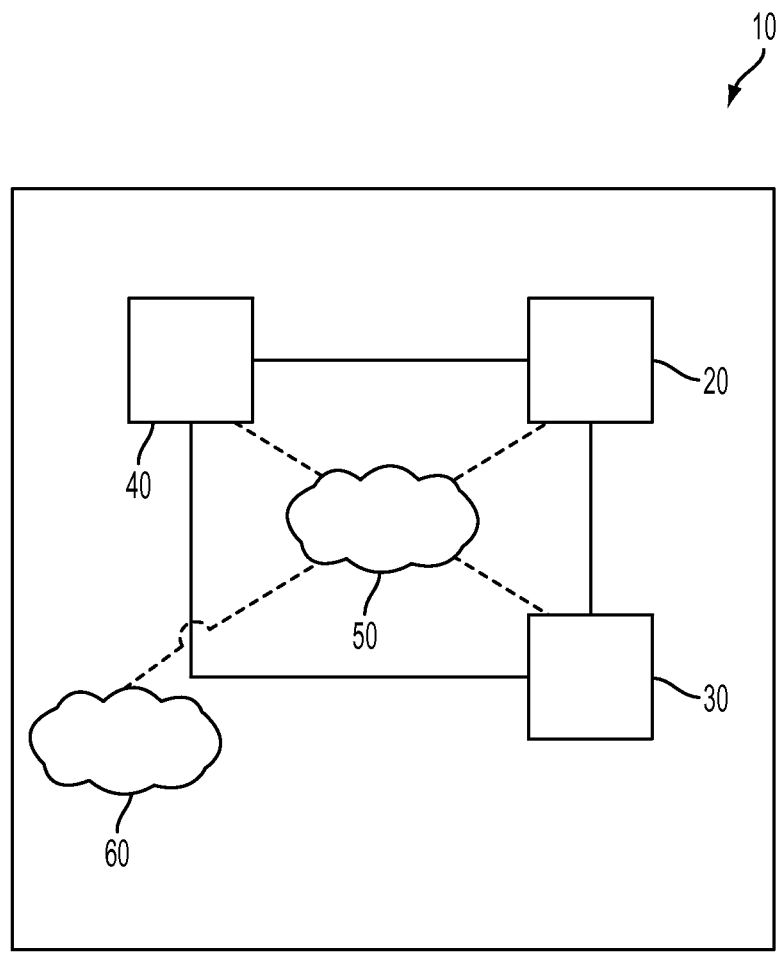
FIG. 1 is a block diagram of a physical switch including a virtual switch environment in accordance with an exemplary embodiment of the present invention.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a physical switch 10 is shown according to an exemplary embodiment of the present invention. The physical switch 10 may be configured to house all or a portion of a virtual switch environment. The physical switch 10 may include a processor 20, a memory module 30, and a data storage module 40. The memory module 30 may be a non-volatile memory, for example non-volatile random access memory (NVRAM) or flash memory. The data storage module 40 may include software data that may include instructions for operating a virtual switch 50. The virtual switch 50 may access the processor 20, the memory module 30, and the data storage 40 to establish the virtual switch environment. A virtual data storage area 60 may be part of the virtual switch environment configured to provide stored data to the virtual switch 50 on demand.

In an exemplary embodiment, the virtual switch 50 may be part of a distributed fabric of virtual switches. For sake of illustration, only a single virtual switch 50 is shown. However, in some embodiments, a plurality of virtual switches 50 may operate within the physical switch 10. In some embodiments, the virtual switch 50 may be connected to virtual switches 50 residing remotely from the physical switch 10.

Figure 2:
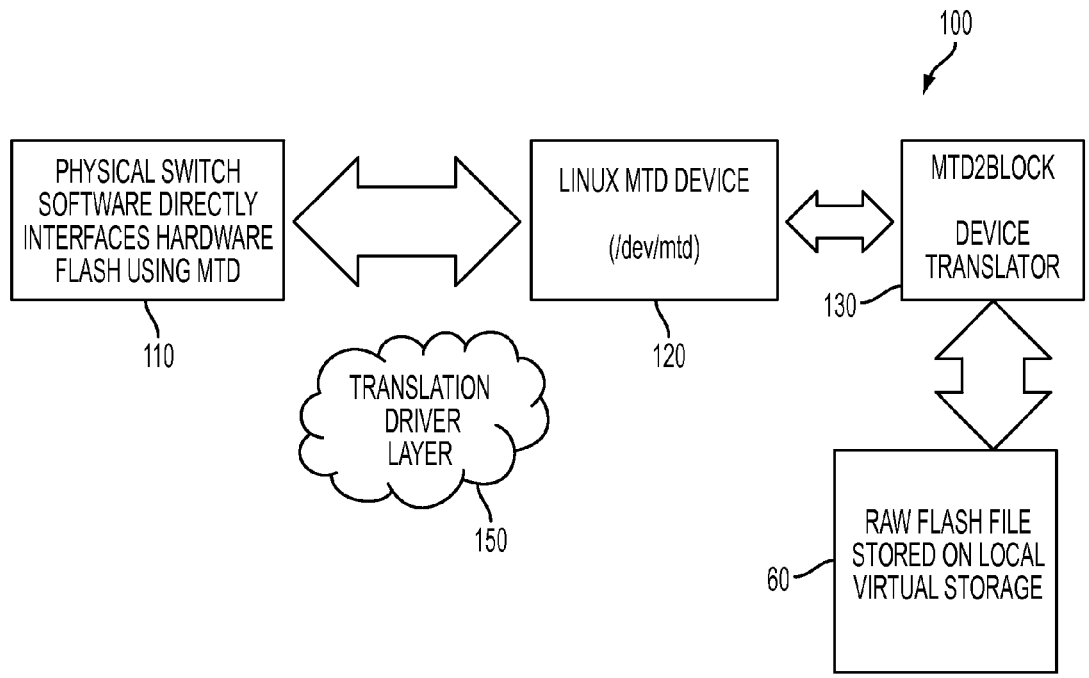
FIG. 2 is a block diagram of software architecture for translating physical switch software into a virtual switch storage area in accordance with another exemplary embodiment of the present invention.

Referring now to FIGS. 1 and 2, software architecture 100 for translating software for the physical switch 10 into the virtual data storage area 60 is shown according to another exemplary embodiment of the present invention. The architecture 100 may be configured to translate physical switch operating instructions 110 to the virtual data storage area 60. The non-volatile memory module 20 may interface operating instructions 110 resident on the physical switch 10. A translation driver layer 150 operated by the processor 20 may manage the interaction between a simulated non-volatile memory and the physical switch software 110. In an exemplary embodiment, the simulated non-volatile memory may be resident on the physical switch 10. In an exemplary embodiment, Linux ® coding may be used for operating instructions. Flash type memory containing the operating instructions 110 may be interfaced using a memory technology device (MTD) 120. High level wrapper functions may interface with a Linux MTD device 120 using for example, read() write(), open() and close()type functionality. These functions may be intercepted by the translation driver layer 150. The translation driver layer 150 may determine if a raw flash type file is available on the virtual data storage area 60. It will be understood that a "raw" flash type file may be one where the contents of the flash are stored directly as data instead of being in some standard structured format such as, for example, a JFFS2 file system. The translation driver layer 150 may employ a device translator 130 to determine if the mapping for the MTD device 120 to block device (raw flash file) is setup correctly. For example, the translation driver layer 150 may determine if the raw flash file matches the block size and sector size associated with the non-volatile memory module 30. If a "JFFS2" or another file system is used on non-volatile memory module 30, the translation driver layer 150 may handle the creation and management of the file system over the MTD device translator 130. The translator 130 may take requests that are designed for MTD memory devices, mapping those block/sector locations to a block/sector location on the physical storage device so that an operation may be performed on the block device (virtual data storage area 60).

Figure 3:
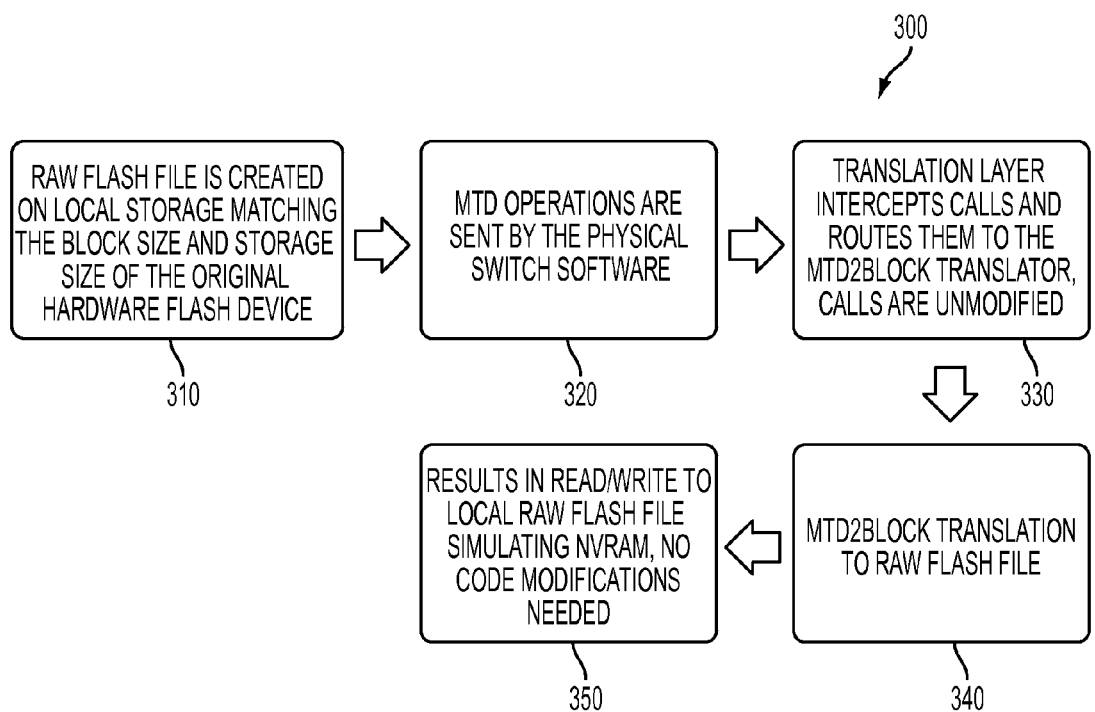
FIG. 3 is a flow chart of a process of simulating a non-volatile memory in a virtual switch environment in accordance with yet another exemplary embodiment of the present invention.

Referring now to FIG. 3, a process 300 of simulating a non-volatile memory in a virtual switch environment is shown. The processor 20 may access 310 the physical non-volatile memory module 30 on the physical switch 10 for operating instructions 110. A raw flash type file may be created based on the operating instructions 110 accessed. The flash type file may be stored in the data storage area 40. The flash type file may have a block size and storage size associated with the non-volatile memory in the memory module 30. The processor 20 may operate 320 the Linux translation driver 150 to interface with the physical non-volatile memory module 30. MTD function calls may be sent by the physical switch 10 to the translation driver 150. The translation layer 150 may route 330 the function calls to the MTD device translator 130. The MTD device translator 130 may translate 340 the raw flash type file set of operating instructions into a flash type file readable within the virtual switch 50. The processor 20 may store 350 the translated flash type file to the virtual memory area 60 as a virtual flash file. The virtual switch 50 may access the translated flash type file in the virtual memory area 60 for use as operating instructions in the virtual switch 50.

It may be appreciated that no code changes may be needed because the block size and physical storage size of the virtual flash files are identical to the original physical flash device. As such, hard-coded offsets and memory locations on the virtual flash are the same as they would be on the physical flash. In addition, since translation layer 150 accepts MTD calls, no upstream functions need to be modified. Translation may perform read/write in MTD raw format, which may be stored directly to a virtual disk. The software running in the virtual environment may behave as it would on a physical device because it accesses the virtual flash file as a simulated non-volatile memory.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A physical network switch, comprising:
    a non-volatile memory module resident on the physical network switch;
    a virtual memory storage architecture, that simulates a non-volatile memory in a virtual switch, to store a raw flash type file, wherein contents of the raw flash type file are stored directly as data;
    a data storage module including a translation driver layer; and
    a processor configured to:
        operate the translation driver layer to translate a structured flash type file that is stored in the physical non-volatile memory module using a first memory technology device, and
        store the translated structured flash type file in the raw flash type file in the virtual memory storage architecture using a second memory technology device, wherein the first memory technology device is different than the second memory technology device, and wherein hard-coded offsets and memory locations of the translated structured flash type file stored in the physical non-volatile memory module are the same as hard-coded offsets and memory locations, respectively, of the raw flash type file stored in the virtual memory architecture.

2. The network switch of claim 1, wherein the non-volatile memory module is a non-volatile random access memory (NVRAM).

3. The network switch of claim 1, wherein the non-volatile memory module is a flash memory.

4. The network switch of claim 1, wherein the processor is configured to operate the translation driver to determine if the flash type file includes a block size and a sector size corresponding to the non-volatile memory module.

5. The network switch of claim 1, wherein the virtual memory storage architecture is configured to read/write to the flash type file in the virtual memory storage architecture.

6. A computer program product for simulating non-volatile memory in a virtual switch, the computer program product comprising a computer readable storage medium having computer readable program code embodied therewith, the computer readable program code being configured to:
    access, via a physical non-volatile memory module on a physical switch, a set of operating instructions, wherein the set of operating instructions are stored in the physical non-volatile memory module using a structured file format;
    operate a Linux translation driver to interface with the physical non-volatile memory module;
    translate, using the Linux translation driver, the set of operating instructions, accessed in the physical non-volatile memory module, into a raw flash type file of the set of operating instructions;
    store the translated raw flash type file to a virtual memory area, that simulates a non-volatile memory in the virtual switch, using a non-structured file format, wherein hard-coded offsets and memory locations of the operating instructions stored in the physical non-volatile memory module are the same as hard-coded offsets and memory locations, respectively, of the operating instructions stored as a raw flash type file in the virtual memory area; and
    access, with the virtual switch, the translated raw flash type file in the virtual memory area for use as operating instructions in the virtual switch.

7. The computer program product of claim 6, the computer readable program code being configured to read or write to the translated flash type file in the virtual memory area.

8. The computer program product of claim 6, the computer readable program code being configured to determine whether the translated flash type file includes a block size and a sector size corresponding to the physical non-volatile memory module, wherein the determination is made prior to storing the translated flash type file to the virtual memory area.

* * * * *